United States Patent
Chen et al.

(10) Patent No.: US 12,515,083 B2
(45) Date of Patent: Jan. 6, 2026

(54) THERMORESPONSIVE FACIAL MASK AND MATERIALS THEREOF

(71) Applicants: Jing Young Biotech Business Co., Ltd., Taichung (TW); Kuo Pin Cheng, Taichung (TW)

(72) Inventors: Yi Wei Chen, Taichung (TW); Kuo Pin Cheng, Taichung (TW); Wei Hao Lee, Taichung (TW); Ta Wui Cheng, Taichung (TW); Ke Yang Chen, Taichung (TW)

(73) Assignees: JING YOUNG BIOTECH BUSINESS CO., LTD., Taichung (TW); Kuo Pin Cheng, Taichung (TW)

( * ) Notice: Subject to any disclaimer, the term of this patent is extended or adjusted under 35 U.S.C. 154(b) by 862 days.

(21) Appl. No.: 17/699,572

(22) Filed: Mar. 21, 2022

(65) Prior Publication Data

US 2022/0305304 A1 Sep. 29, 2022

Related U.S. Application Data

(60) Provisional application No. 63/165,874, filed on Mar. 25, 2021.

(51) Int. Cl.
*A62B 18/08* (2006.01)
*A41D 13/11* (2006.01)
(Continued)

(52) U.S. Cl.
CPC .............. *A62B 18/08* (2013.01); *A41D 13/11* (2013.01); *A61K 9/7061* (2013.01); *A61L 15/44* (2013.01);
(Continued)

(58) Field of Classification Search
CPC .... A62B 18/08; A41D 13/11; A41D 2500/30; A61K 9/7061; A61K 8/0212;
(Continued)

(56) References Cited

U.S. PATENT DOCUMENTS

| | | | |
|---|---|---|---|
| 2008/0132862 A1* | 6/2008 | Collias | D04H 1/43838 442/329 |
| 2012/0157904 A1* | 6/2012 | Stein | D04H 1/49 427/430.1 |
| 2015/0335742 A1* | 11/2015 | Vissman | D06M 11/79 501/105 |

FOREIGN PATENT DOCUMENTS

| | | | | |
|---|---|---|---|---|
| CN | 109620742 A | * | 4/2019 | .......... A61K 8/0212 |
| KR | 200466565 Y1 | * | 4/2013 | .............. D02G 3/38 |
| KR | 101769416 B1 | * | 8/2017 | ............... A61K 8/97 |

OTHER PUBLICATIONS

Kim Ran, Multifunctional mask composition and preparing method of the same including anti-wrinkles and whitening functions, 2017, Espacenet Translation (Year: 2017).*

(Continued)

*Primary Examiner* — Nicholas J. Weiss
*Assistant Examiner* — Brandon W. Levy
(74) *Attorney, Agent, or Firm* — MUNCY, GEISSLER, OLDS & LOWE, P.C.

(57) ABSTRACT

A thermoresponsive facial mask has a non-woven fabric structure with multiple layers, wherein at last one of the layers of the non-woven fabric structure has far-infrared hollow fibers. The far-infrared hollow fibers content far-infrared powers that emit a far-infrared radiation. A formula for the thermoresponsive facial mask has a polyalcohol and a germanium element, which promotes the thermoresponsive facial mask to generate an advantage of forming the warming effect automatically.

9 Claims, 5 Drawing Sheets

(51) Int. Cl.
*A61K 9/70* (2006.01)
*A61L 15/44* (2006.01)
*A61L 26/00* (2006.01)
*A61N 5/00* (2006.01)
*C08L 33/04* (2006.01)
*C09K 5/14* (2006.01)
*A61N 5/06* (2006.01)
*D04H 1/4382* (2012.01)
*D04H 3/073* (2012.01)

(52) U.S. Cl.
CPC ............ *A61L 26/0066* (2013.01); *A61N 5/00* (2013.01); *C08L 33/04* (2013.01); *C09K 5/14* (2013.01); *A41D 2500/30* (2013.01); *A61N 2005/066* (2013.01); *C08L 2203/12* (2013.01); *D04H 1/43838* (2020.05); *D04H 3/073* (2013.01); *Y10T 442/612* (2015.04)

(58) Field of Classification Search
CPC ..... A61K 8/027; A61K 2800/10; A61L 15/44; A61L 26/0066; A61N 5/00; A61N 2005/066; A61N 1/0404; C08L 33/04; C08L 2203/12; C08L 33/08; C09K 5/14; D04H 1/43838; D04H 3/073; Y10T 442/612; Y10T 442/659; C08K 3/08; C08K 5/053; A45D 44/002; A45D 2200/1027; A45D 2200/1036; A61F 2007/0088; D01F 1/10; B32B 5/022; B32B 2307/728; A61Q 19/00
See application file for complete search history.

(56) References Cited

OTHER PUBLICATIONS

Mask Pack, 2013, Espacenet Translation (Year: 2013).*

* cited by examiner

THERMORESPONSIVE FACIAL MASK AND MATERIALS THEREOF

FIELD OF INVENTION

A non-woven fabric structure, especially a thermoresponsive facial mask and materials thereof.

BACKGROUND OF THE INVENTION

According to the research, from 2013 to 2017, the compound annual growth rate (CAGR) of the global facial mask market was already achieved to 12%. The sales volume in 2017 of the global facial mask market, increased over 10.4% comparing to the previous year, was reached to 6.3 billion US dollars. It is worth mentioning that from 2012 to 2017, the sales quota of Asia-Pacific area took the global facial mask market went up significantly from 67% to 84%, and the Asia-Pacific area become the primary target market of facial mask.

However, it always comes an uncomforted freezing feel when the facial mask attaches on especially in the frozen winter that makes the facial mask unable to be widely used in winter or cold regions. Therefore, providing a facial mask which is suitable for winter or cold regions can help consumer welling to use and improve the development of related industries.

SUMMARY OF THE INVENTION

To overcome the aforementioned shortcomings of the prior facial mask, the present invention provides a thermoresponsive facial mask and materials which is suitable used for winter or cold regions.

The present invention provides a thermoresponsive facial mask comprising a multiple layer non-woven fabric structure and a formula, the non-woven fabric structure comprising multiple first superfine fibers, multiple second superfine fibers, multiple far-infrared hollow fibers, and multiple functional fibers, and at last one layer of the non-woven fabric structure having the far-infrared hollow fibers.

A volume of the first layer and the second layer takes 20 to 30% of the entire volume of the non-woven fabric structure, the far-infrared hollow fiber contents a far-infrared material emitting a far-infrared radiation, and the functional fibers are made of polyacrylate and exhibits the moisture absorbing and thermal generating function. The formula contented in the non-woven fabric structure comprises a polyalcohol and a germanium element, a volume of the polyalcohol takes the formula between 8 to 20%, and a concentration of the germanium element is between 10 to 20 ppm.

Wherein, the far-infrared hollow fibers are polyester hollow fibers comprising far-infrared powders, and the far-infrared powders have a volume ranged 5% to 10% of the entire volume of the far-infrared hollow fibers.

Wherein, each one of the first superfine fibers and the second superfine fibers have a fiber diameter between 0.8 to 2.0 denier and a fiber length between 30 to 60 micrometer, the first superfine fibers are made of cellulose fiber, rayon fiber, polyester fiber or nylon 6 fiber, and the second superfine fibers are made of cellulose fiber, rayon fiber, polyester fiber or nylon 6 fiber.

Wherein, the polyalcohol is selected from the group consisting of propylene glycol, butylene glycol, glycerol, pentanediol, ethohexadiol and ethylene glycol, and the portion of polyalcohol takes the formula 15% and the concentration of the germanium element is 15 ppm.

Wherein, the functional fibers have a fiber diameter between 0.8 to 1.05 denier and a fiber length between 30 to 60 micrometer.

Wherein, the non-woven fabric structure sequentially comprises a first layer comprising the first superfine fibers, a seconded layer comprising the second superfine fibers, a third layer comprising the far-infrared hollow fibers, the third layer takes 30 to 40% of the entire non-woven fabric structure, and a fourth layer comprising the functional fibers, the fourth layer takes the entire non-woven fabric structure ranged in 20 to 30%.

Wherein, the non-woven fabric structure sequentially comprises a first layer comprising the first superfine fibers and the second superfine fibers, a second layer comprising the far-infrared hollow fibers, the second layer takes the entire non-woven fabric structure ranged in 30 to 40%, and a third layer comprising the functional fibers, the third layer takes 20 to 30% of the entire non-woven fabric structure.

Wherein, the first superfine fibers and the second superfine fibers comprise different fiber diameter.

The present invention also provides a non-woven fabric structure composed of multiple layers comprising multiple first superfine fibers, multiple second superfine fibers, multiple far-infrared hollow fibers, and multiple functional fibers, at last one layer of the non-woven fabric structure having the far-infrared hollow fibers.

Wherein, a volume of the first layer and the second layer takes 20 to 30% of the entire volume of the entire non-woven fabric structure, the far-infrared hollow fibers comprise far-infrared powders, and the far-infrared powders have a volume ranged 5% to 10% of a total volume of the far-infrared hollow fibers, and the functional fibers are made of polyacrylate and exhibits the moisture absorbing and thermal generating function.

Wherein, the far-infrared hollow fibers are polyester hollow fibers comprising the fiber diameter between 1.2 to 2.0 denier and the fiber length between 30 to 60 micrometer, and the far-infrared powders have a volume ranged 5 to 10% of the entire volume of the far-infrared hollow fibers.

Wherein, each one of the first superfine fibers and the second superfine fibers has a fiber diameter between 0.8 to 2.0 denier and a fiber length between 30 to 60 micrometer, the first superfine fibers are made of cellulose fiber, rayon fiber, polyester fiber or nylon 6 fiber, and the second superfine fibers are made by cellulose fiber, rayon fiber, polyester fiber or nylon 6 fiber.

Wherein, the functional fibers comprise the fiber diameter between 0.8 to 1.05 denier and the fiber length between 30 to 60 micrometer.

Wherein, the non-woven fabric structure sequentially comprises a first layer comprising the first superfine fibers, a seconded layer comprising the second superfine fibers, a third layer comprising the far-infrared hollow fibers, the third layer takes the entire non-woven fabric structure ranged in 30 to 40%, and a fourth layer comprising the functional fibers, the fourth layer takes the entire non-woven fabric structure ranged in 20 to 30%.

Wherein, the non-woven fabric structure sequentially comprises a first layer comprising the first superfine fibers and the second superfine fibers, a seconded layer comprising the far-infrared hollow fibers, the second layer takes 30 to 40% of the entire non-woven fabrics structure, and a third layer comprising the functional fibers, the third layer takes the entire non-woven fabric structure ranged in 20 to 30%.

The present invention also provides a formula comprising a polyalcohol and a germanium element.

Wherein, a volume of the polyalcohol takes the formula between 8 to 20%, and a concentration of the germanium element is between 10 to 20 ppm.

Wherein, the polyalcohol is selected from the group consisting of propylene glycol, butylene glycol, glycerol, pentanediol, ethohexadiol and ethylene glycol, and the proportion of polyalcohol takes the formula 15% and the concentration of the germanium element is in 15 ppm.

Wherein, the formula further comprises a thickening agent, a pH regulator or a skin-cared agent.

The present invention combines the structure of the non-woven fabric structure and the formula that makes the thermoresponsive facial mask to generate an advantage of forming the warming effect automatically. With the advantage, it may be overcome the uncomforted freezing feel of applying the facial mask in winter or cold regions, and promote the development and sales of related industries.

DETAILED DESCRIPTION OF THE PREFERRED EMBODIMENTS

In order to make purposes, technical solutions, and advantages of the present invention to be clearer, the following content provides some preferred embodiments in accordance with the present invention.

Figure 1:
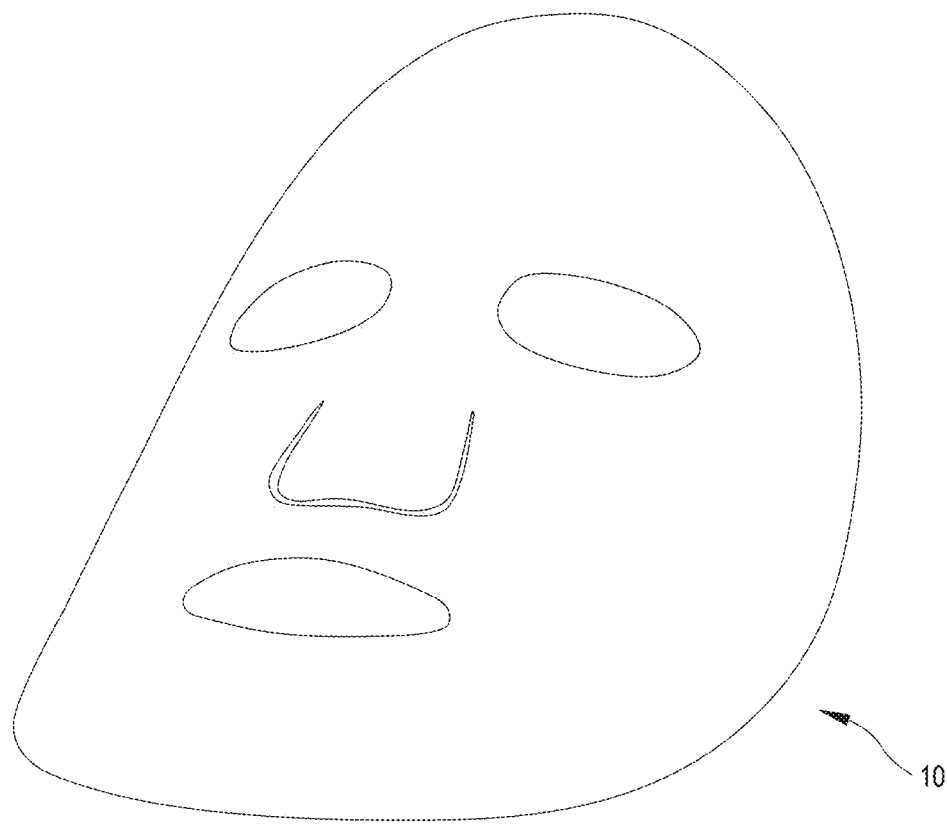
FIG. 1 is a first preferred embodiment of a thermoresponsive facial mask in accordance with the present invention.
Figure 1A:
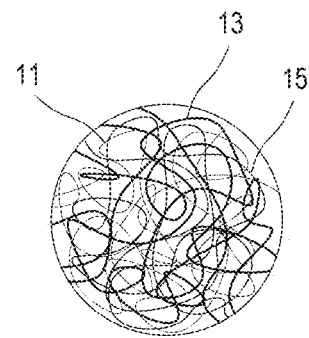
FIG. 1A is an enlarged side view of the thermoresponsive facial mask in FIG. 1.

With reference to FIG. 1, a non-woven fabric structure 10 comprises multiple first superfine fibers 11, multiple second superfine fibers 13, multiple far-infrared hollow fibers 15, and multiple functional fibers 14 made of polyacrylate that can exhibit the moisture absorbing and thermal generating function. The first superfine fibers 11, the second superfine fibers 13, the far-infrared hollow fibers 15, and the functional fibers 14 are randomly arranged in the non-woven fabric structure 10. A total weight of the first superfine fibers 11 and the second superfine fibers 13 takes 10 to 60 wt % of the entire weight of the non-woven fabric structure 10.

The material of the first superfine fibers 11 and the second superfine fibers 13 can be cellulose fiber, rayon fiber, polyester fiber or nylon 6 fiber. Preferably, the first superfine fibers 11 and the second superfine fibers 13 are made of normal polyester fiber which is unmodified and without other functional element. The unmodified normal polyester fiber has advantages with absorbency, skin-friendly, fitting, soft and smooth texture. The diameter of first superfine fibers 11 is different from the diameter of the second superfine fibers 13, such that the stack between the first superfine fibers 11 and the second superfine fibers 13 becomes solid and delicate. The non-woven fabric structure 10 including fibers in different diameters can prevent the high-cost problem caused by a non-woven fabric structure including fibers in small diameter entirely.

Preferably, the first superfine fibers 11 and the second superfine fibers 13 are selected by rayon staple fiber or viscose rayon staple fiber in a fiber diameter between 0.8 to 2.0 denier (D) and a fiber length between 30 to 60 micrometer (μm), so that the non-woven fabric structure 10 has breathable, soft-touching and anti-static features. The first superfine fibers 11 and the second superfine fibers 13 also can be nylon 6 staple fiber in the fiber diameter between 1.0 to 2.0 denier (D) and the fiber length between 30 to 60 micrometer (μm) to perform elasticity, shrink resistant and good durability.

The far-infrared hollow fibers 15 preferably are selected by polyester hollow fibers having a fiber diameter between 1.2 to 2.0 denier (D) and a fiber length between 30 to 60 micrometer (μm). The far-infrared hollow fibers 15 comprise far-infrared powders which can emit a far-infrared radiation and exhibit a warm-keeping characteristic. With the far-infrared powders and the hollow structure of the far-infrared hollow fibers 15, the far-infrared hollow fibers 15 can not only present a light weight, but also can generate and keep a warm air therein, and even can reduce a diffusion rate and prevent the warm air from escaping.

The far-infrared powders can be selected from the group consisting of magnesium carbonate ($MgCO_3$), zirconia ($ZrO_2$), aluminum oxide ($Al_2O_3$), silicon dioxide ($SiO_2$) and kaolinite ($Al_2(Si_2O_5)(OH)_4$). The far-infrared powders are spread evenly in the far-infrared hollow fibers 15 with a range between 5% to 10% in the volume of the far-infrared hollow fibers 15. With high content of the far-infrared powders and the far-infrared hollow fibers 15 evenly and randomly arrangement by non-woven technology, the non-woven fabric structure 10 can display an entire emission effect of the far-infrared radiation.

The functional fibers 14 preferably are made of polyacrylate fiber having the fiber diameter between 0.8 to 1.05 denier (D) and the fiber length between 30 to 60 micrometer (μm), such that the functional fibers 14 can exhibit a water absorption ranged 30% to 40%. The highly water absorption makes the functional fibers 14 has a high enthalpy material property and perform a thermal generating feature. With the thermal generating feature, the functional fibers 14 can make a user's skin to generate a heat and open the pores of skin when the skin is covered by the functional fibers 14. Accordingly, the essence or other skin-cared liquid contented in the non-woven fabric structure 10 is allowed to permeate through the skin easier and quickly to achieve a batter skin care effectiveness.

In addition, the first superfine fibers 11, the second superfine fibers 13, the far-infrared hollow fibers 15, and the functional fibers 14 are proceeded with a manufacture process including fiber-blending, fiber-splitting, fiber-combing, fiber-laminating or spunlace procedure to form a non-woven fabric. A computer-aided pattern making method is applied to cut a non-woven fabric into multiple non-woven fabric structures 10 with different expected shapes and sizes.

Figure 2:
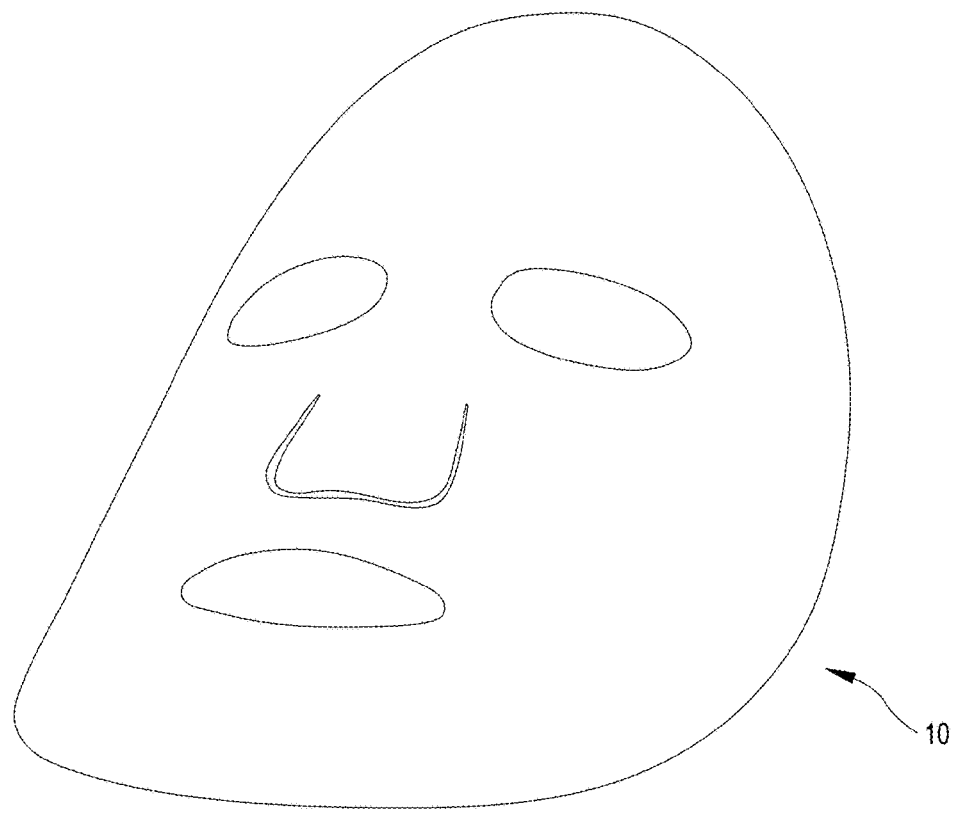
FIG. 2 is a second preferred embodiment of a thermoresponsive facial mask in accordance with the present invention.
Figure 2A:
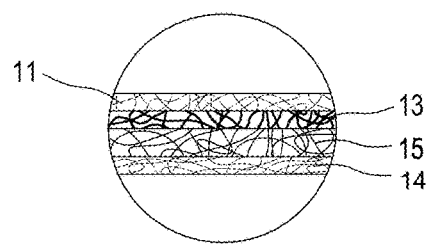
FIG. 2A is an enlarged cross sectional side view of the thermoresponsive facial mask in FIG. 2.

With referring to the FIG. 2, a second preferred embodiment of this present invention is provided. The non-woven fabric structure 10 is a multi-layer structure. At last one layer of the multi-layer structure comprises the far-infrared hollow fibers 15 that makes the non-woven fabric structure 10 content higher percentage of the far-infrared powders than the preferred embodiment mentioned above, and presents a stronger warm-keeping efficiency.

In this preferred embodiment, the non-woven fabric structure 10 from top to bottom sequentially comprises a first layer comprising the first superfine fibers 11, a seconded layer comprising the second superfine fibers 13, a third layer comprising the far-infrared hollow fibers 15, and a fourth layer comprising the functional fibers 14. The volume of the first layer and the second layer combined takes to 30% of the entire volume of the non-woven fabric structure 10, the third layer takes 30 to 40% of the entire non-woven fabric structure 10 in volume, and the fourth layer takes 20 to 30% of the entire non-woven fabric structure 10 in volume.

In addition, the non-woven fabric structure 10 may be a three-layer structure. A difference from the above-mentioned embodiment is that the first layer comprises the first superfine fibers 11 and the second superfine fibers 13, the volume of the first layer takes 20 to 30% of the entire volume of the non-woven fabric structure 10 According to the multiple layer structure of the non-woven fabric structure 10, a fiber volume of each layer may be relatively increased. With the higher fiber volume, the non-woven fabric structure 10 not only can maintain the original feature of each fiber, also can improve the characteristics of heat preservation, moisture absorption and heat generation without affecting a permeability, and enhance the absorb efficiency of the skin.

Referring to the table of Example 1 to the Example 4, features of four non-woven fabric structures 10 are detected after produced by two different processes respectively. Two of non-woven fabric structures 10 are made in a small trial production with a manual cutting process, and two of non-woven fabric structures 10 are received a sampling inspection after produced by a mass production line. A thick and a weigh of each non-woven fabric structure 10 is referred to the CNS1479 standard, a tensile strength and an elongation rate is evaluated by the CNS9520 standard, the CNS9528 standard can measure a web uniformity, the KESS F7 standard can verify a heat preservation, an absorbency (water absorption area) is tested by FTTS-FA-004 standard and ASTM 737-04 standard analyzes a permeability of each non-woven fabric structure 10.

According to the results in the tables from Example 1 to the Example 4, it can be confirmed that the non-woven fabric 10 has the moisture absorbing, the warm-keeping and the breathable features by examining when the test results of tensile strength, permeability, absorbency and heat preservation achieve the standard condition of each standard test mentioned above.

Figure 3:
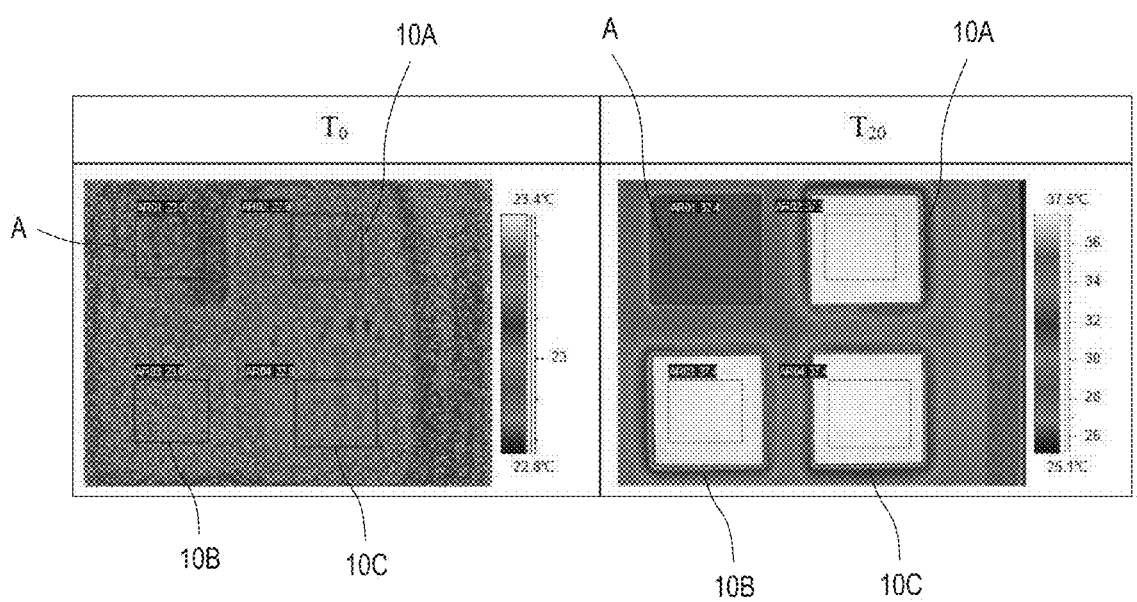
FIG. 3 is a thermal image picture of each non-woven fabric structure.

With reference to FIG. 3, after the water absorbency be tested, a thermal image picture of each non-woven fabric structure 10A~10C was taken according to the standard of FTTS-FA-010 to observe a temperature differentiation in a period time from 0-minute T0 to 20-minute T20. Each non-woven fabric structure 10A~10C exhibits an obviously temperature rising result comparing to a general facial mask A by referring to the color of the thermal image picture. Three regions corresponded to the non-woven fabric structure 10A~10C respectively are turning white at the time of 20-minute T20. And a maximum temperature rising value of each non-woven fabric structure 10 is 2° C., and an average temperature rising value of each non-woven fabric structure 10 in a half hour is 1° C. After moisture absorption, the non-woven fabric 10 performs a better warm-generating characteristic then a general facial mask does.

Example 1

|  |  | Standard Condition | Test Result |
|---|---|---|---|
| Tensile Strength | Machine Direction (Kg) | 7.0~8.0 | 7.5 |
|  | Transverse Direction (Kg) | 2.3~2.8 | 2.4 |
| Elongation Rate | Machine Direction (Kg) | 40~50 | 43 |
|  | Transverse Direction (Kg) | 120~140 | 130 |
| Permeability (cm³/cm²/s) |  | ≥180 | 210.8 |
| Water absorption area (mm²) |  | ≥200 | 281.754 |
| Heat preservation (%) |  | ≥20 | 23.15 |

Example 2

|  |  | Standard Condition | Test Result |
|---|---|---|---|
| Tensile Strength | Machine Direction (Kg) | 7.0~8.0 | 7.6 |
|  | Transverse Direction (Kg) | 2.3~2.8 | 2.5 |
| Elongation Rate | Machine Direction (Kg) | 40~50 | 44 |
|  | Transverse Direction (Kg) | 120~140 | 125 |
| Permeability (cm³/cm²/s) |  | ≥180 | 208 |
| Water absorption area (mm²) |  | ≥200 | 285.3 |
| Heat preservation (%) |  | ≥20 | 22.95 |

Example 3

|  |  | Standard Condition | Test Result |
|---|---|---|---|
| Tensile Strength | Machine Direction (Kg) | 7.0~8.0 | 7.2 ± 10% |
|  | Transverse Direction (Kg) | 2.3~2.8 | 2.5 ± 10% |
| Elongation Rate | Machine Direction (Kg) | 40~50 | 45 ± 10% |
|  | Transverse Direction (Kg) | 120~140 | 120 ± 10% |
| Permeability (cm³/cm²/s) |  | ≥180 | 200 ± 10% |
| Water absorption area (mm²) |  | ≥200 | 250 ± 10% |
| Heat preservation (%) |  | ≥20 | 25 ± 10% |

Example 4

|  | Standard Condition | Test Result |
|---|---|---|
| Permeability (cm³/cm²/s) | ≥180 | 210 ± 10% |
| Water absorption area (mm²) | ≥200 | 278 ± 10% |
| Heat preservation (%) | ≥20 | 23 ± 10% |

A formula for the thermoresponsive facial mask in accordance with the present invention comprises a polyalcohol and a germanium element. The polyalcohol is selected from the group consisting of propylene glycol, butylene glycol, glycerol, pentanediol, ethohexadiol and ethylene glycol. The polyalcohol may perform an advantage of excellent moisturizing with nonirritating to the skin and low cost. Furthermore, the polyalcohol is a best choice that can assist some insoluble molecules dissolve in the formula. With a bacteriostatic ability, the butylene glycol, pentanediol, ethohexadiol and ethylene glycol can stabilize and prolong a period of use of the formula without adding preservatives.

The germanium element, dissolved in the polyalcohol, has a characteristic that promotes the peripheral blood circulation. When smearing the formula comprising the germanium element on the facial skin, a warming effect appears automatically. The warming effect generated from the formula may open the pores of facial skin that not only makes the material in the formula can be permeated through the skin easier but also improves the circulation of blood and lymph to achieve a soothing and relaxing efficacy.

Preferably, the proportion of the polyalcohol in the volume of the formula is between 8 to 20%, and a concentration of the germanium element in the formula is between 10 to 20 ppm. Because the polyalcohol has a high boiling point and a low evaporation rate, using a higher proportion of the polyalcohol can prevent the water evaporating, maintain moisturizing effect and even keep the germanium element last on the skin longer. Preferably, the proportion of polyalcohol in the formula is 15%, and the concentration of the germanium element is in 15 ppm.

Moreover, adding some addition agent for example thickening agent, pH regulator or other skin-cared agent depending on the necessary is allowed. The addition agent makes the formula be able to be expressed in various thick type, skin-cared effect and a suitable pH value for human body. Referring to the Table 1 and Table 2, the preferred embodiments of the formula 1 and the formula 2 in the present invention are shown. Both of the formula 1 and the formula 2 are using an acrylates/C10-30 alkyl acrylate arosspolymer as the thickening and moisturizing agent, an arginine as the pH regulator and a sodium hyaluronate or/and a sodium carboxymethyl cellulose to skin moisturize. In addition, the purpose of adding a sodium ascorbyl phosphate in the formula 1 is to be the skin-cared agent for skin whitening, and a malachite extract which is the skin-cared agent added in formula 2 can assist to skin conditioning.

TABLE 1

| Formula 1 Group | Material | Percentage of Total Volume (ml) |
| --- | --- | --- |
| A | Water | 82~83 |
|  | Acrylates/C10-30 Alkyl Acrylate Crosspolymer | 0.20 |
|  | Arginine | 0.15 |
| B | Sodium Hyaluronate | 0.05 |
|  | Propanediol | 5 |
|  | Glycerin | 5 |
| C | Pentylene Glycol | 3 |
|  | Propanediol Caprylhydroxamic acid 1.2-Hexanediol | 1.4 |
| D | Germanium | 15 ppm |
|  | Sodium Carboxymethyl Cellulose | 2.0 |
|  | Sodium ascorbyl phosphate | 0.1 |
| E | Arginine | 0.05~0.1 |
| Total Volume (ml) |  | 100 |

TABLE 2

| Formula 2 Group | Material | Percentage of Total Volume (ml) |
| --- | --- | --- |
| A | Water | 81 |
|  | Acrylates/C10-30 Alkyl Acrylate Crosspolymer | 0.15 |
|  | Arginine | 0.15 |
| B | Sodium Hyaluronate | 0.1 |
|  | Propanediol | 5 |
|  | Glycerin | 5 |
| C | Pentylene Glycol | 5 |

TABLE 2-continued

| Formula 2 Group | Material | Percentage of Total Volume (ml) |
| --- | --- | --- |
| D | Germanium | 15 ppm |
|  | Sodium Carboxymethyl Cellulose | 3 |
|  | Malachite Extract | 0.5 |
| E | Arginine | 0.05 |
| Total Volume (ml) |  | 100 |

A preferred embodiment of the method for manufacturing the formula in accordance with the present invention comprises steps of:

Blanding all the material in a group A to form a medium. The group A comprising a thickening agent to reduce a liquidity that can keep the formula on the face from runoff, and a pH regulator to control the pH value of the formula at 5.5 to 6.5. The pH regulator not only controls the pH value suiting for face skin but avoids a bad effect from the material due to the over-acid or over-alkaline environment of the medium.

Forming a first solution by adding the materials of a group B into the medium slowly, respectively and until well mixed;

Mixing the materials in a group C slowly and respectively into the first solution to form a second solution. Wherein, the pentylene glycol may exhibit an excellent antibacterial and moisturizing property;

Adding the materials in a group D slowly and respectively into the second solution. Wherein, the group D comprising the germanium element and the skin-cared agent; and Forming the formula by adding the materials of group E and adjusting the pH between 5.5 to 6.5.

According to the Experiment 1, two sides of a face of a tester are received two facial masks with a general essence and the formula 1, respectively. A skin temperature of two sides is then tested at every time point of a period of time. It can be observed obviously that the side of the face of the first tester applied with the formula 1 can generate a warm temperature higher than the other side even at a 5° C. difference. During the period of mask applying time, the warm temperature generated from the formula 1 is remained in a stable state lower than a starting temperature rather than headed up with the time goes by that can significantly confirm a safety when using the formula 1.

After the masks are removed, the side applied with the formula 1 maintains the warm temperature for at late 45 minutes continuously, and forms a at least 1° C. difference comparing to the other side. Thus, the formula 1 exhibits a long-term warm-keeping effect and improves the efficiency of skin-absorbency.

Experiment 1

| Status | Time point (mm) | Skin temperature(° C.) General essence | Skin temperature(° C.) Formula 1 | Environment temperature (° C.) | Environment humidity (° C.) |
| --- | --- | --- | --- | --- | --- |
| Start | 0 | 35.4 | 35.4 | 26.3 | 65 |
| Apply the mask | 0 | 32.3 | 32.5 | 26.3 | 65 |
| During use | 1 | 31.8 | 32.8 | 26.1 | 65 |
|  | 3 | 31.3 | 33.5 | 26.1 | 66 |
|  | 5 | 30.9 | 33.8 | 26.1 | 66 |
|  | 10 | 30.7 | 34.4 | 26.1 | 66 |

-continued

| Status | Time point (mm) | Skin temperature(° C.) General essence | Skin temperature(° C.) Formula 1 | Environment temperature (° C.) | Environment humidity (° C.) |
|---|---|---|---|---|---|
| | 15 | 30.1 | 35.2 | 26.1 | 65 |
| Remove | 15.5 | 29.5 | 35.2 | 26.2 | 66 |
| After removal | 16 | 29.4 | 34.9 | 26.2 | 66 |
| | 18 | 33.2 | 35.2 | 26.3 | 66 |
| | 20 | 34.8 | 35.6 | 26.2 | 66 |
| | 25 | 35.1 | 35.8 | 26.2 | 66 |
| | 30 | 35.1 | 36.1 | 26.2 | 65 |
| | 45 | 35.3 | 36.1 | 26.2 | 65 |
| 1 hr after removal | 60 | 35.3 | 35.9 | 26.2 | 66 |

Figure 4:
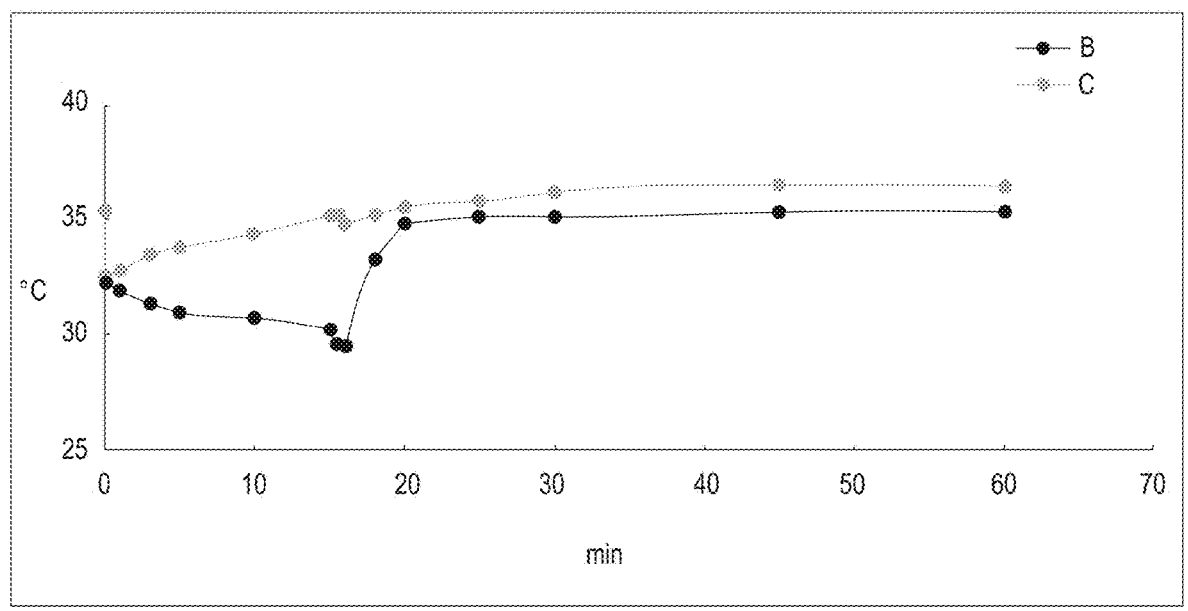
FIG. 4 is a comparison diagram of a skin temperature test.

With reference to Experiment 2 and FIG. 4, a second tester is applied with two face masks with the general essence and the formula 2 respectively on the two sides of face. The skin temperature of two sides is tested at every time point of a period of time. For certainly, whether during the time when applying the formula 2 or after removal, the one side of the face presents the result with the warm temperature higher than the other side, and without any safety concern of overheating.

FIG. 4 reveals a comparison diagram with the two sides of the face of the tester applied with the general essence and the formula respectively. Not only the steadily rising curve corresponding to the side applied the formula can be seen, a suddenly dropping curve of the other side at the time point of 15 minute regarding to the moment of remove the mask can also be observed significantly.

Experiment 2

| Status | Time point (mm) | Skin temperature(° C.) General essence | Skin temperature(° C.) Formula 1 | Environment temperature (° C.) | Environment humidity (° C.) |
|---|---|---|---|---|---|
| Start | 0 | 35.2 | 35.3 | 26.3 | 65 |
| Apply the mask | 0 | 32.1 | 32.3 | 26.3 | 65 |
| During use | 1 | 31.8 | 32.8 | 26.1 | 65 |
| | 3 | 31.2 | 33.2 | 26.1 | 66 |
| | 5 | 30.8 | 33.6 | 26.1 | 66 |
| | 10 | 30.5 | 34.2 | 26.1 | 66 |
| | 15 | 30.2 | 34.8 | 26.1 | 65 |
| Remove | 15.5 | 29.7 | 34.6 | 26.2 | 66 |
| After removal | 16 | 29.4 | 34.2 | 26.2 | 66 |
| | 18 | 33.3 | 34.8 | 26.3 | 66 |
| | 20 | 34.5 | 35.3 | 26.2 | 66 |
| | 25 | 34.9 | 35.5 | 26.2 | 66 |
| | 30 | 35.1 | 35.8 | 26.2 | 65 |
| | 45 | 35.3 | 35.9 | 26.2 | 65 |
| 1 hr after removal | 60 | 35.2 | 35.7 | 26.2 | 66 |

Figure 5:
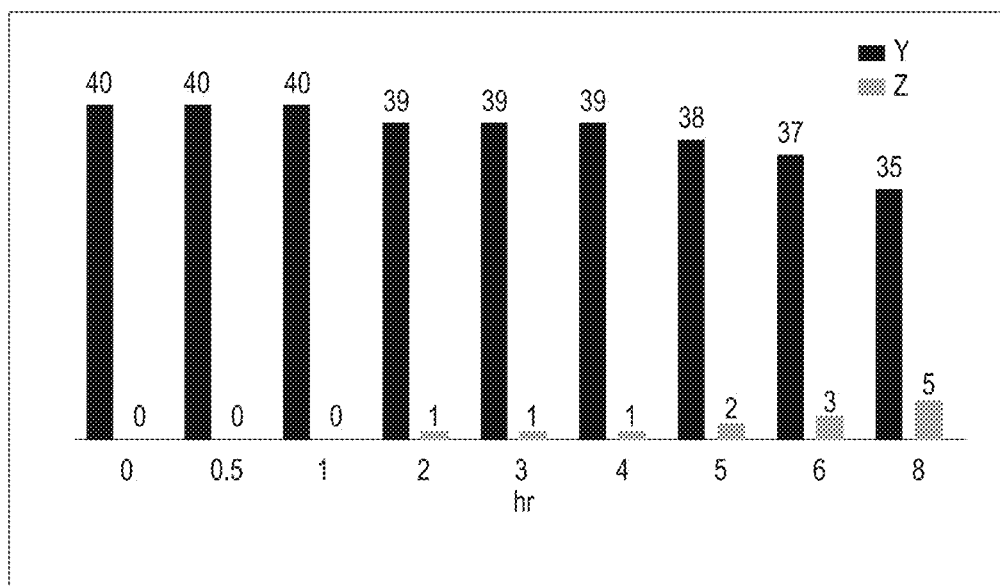
FIG. 5 is a bar graph of a moisturizing feeling test.

With reference to FIG. 5, a bar graph of a survey with a moisturizing feeling of multiple testers shows that the thermoresponsive facial mask exhibits an extremely moisturizing characteristic after 6 hours of use.

With the material characteristic of the polyalcohol, the polyalcohol not only can maintain the moisturizing effect, but an antisepsis function it may present. Referring to the Experiment 3, the antisepsis function of the formula is tested according to an antimicrobial effectiveness testing. The formula is arranged in five sterile bottles and inoculate five different bacteria strains respectively and then cultured in an incubator. Wherein, each number of the five bacteria strains are $6.8 \times 10^6$ CFU/ml *Escherichia coli* (ATCC 8739), $4.5 \times 10^5$ CFU/ml *Pseudomonas aeruginosa* (ATCC 9027), $7.5 \times 10^6$ CFU/ml *Staphylococcus aureus* (ATCC 6538), $1.9 \times 10^6$ CFU/ml *Candida albicans* (ATCC 10231) and $2.1 \times 10^6$ CFU/ml *Aspergillus brasiliensis* (ATCC 16404).

After 7,14,21,28 days incubation, the formula is taken out from each sterile bottle and is detected the number of each bacteria strain. The result in the Experiment 3 not only proves that the formula inhibits the growth of bacteria, but also shows that the level of each bacteria strain is decreased comparing to the number of original inoculations. For certainly, the formula comprising the polyalcohol exhibits the antisepsis function without adding additional preservative, can reduce the entire cost and become skin friendly.

Experiment 3

| Strain | Number of the bacteria when inoculation | Day | Number of the bacteria after incubation |
|---|---|---|---|
| *Escherichia coli* (ATCC 8739) | $6.8 \times 10^6$ CFU/ml | 7 | $1 \times 10^4$ CFU/ml |
| | | 14 | <1 CFU/ml |
| | | 21 | <1 CFU/ml |
| | | 28 | <1 CFU/ml |
| *Pseudomonas aeruginosa* (ATCC 9027) | $4.5 \times 10^5$ CFU/ml | 7 | <1 CFU/ml |
| | | 14 | <1 CFU/ml |
| | | 21 | <1 CFU/ml |
| | | 28 | <1 CFU/ml |
| *Staphylococcus aureus* (ATCC 6538) | $7.5 \times 10^6$ CFU/ml | 7 | <1 CFU/ml |
| | | 14 | <1 CFU/ml |
| | | 21 | <1 CFU/ml |
| | | 28 | <1 CFU/ml |
| *Candida albicans* (ATCC 10231) | $1.9 \times 10^6$ CFU/ml | 7 | <1 CFU/ml |
| | | 14 | <1 CFU/ml |
| | | 21 | <1 CFU/ml |
| | | 28 | <1 CFU/ml |
| *Aspergillus brasiliensis* (ATCC 16404) | $2.1 \times 10^6$ CFU/ml | 7 | <1 CFU/ml |
| | | 14 | <1 CFU/ml |
| | | 21 | <1 CFU/ml |
| | | 28 | <1 CFU/ml |

The present invention combines the structure of the non-woven fabric structure 10, the far-infrared contented in the far-infrared hollow fibers 15 and the formula that makes the thermoresponsive facial mask to generate an advantage of forming the warming effect automatically. With the advantage, it may be overcome the uncomforted freezing feel of applying the facial mask in winter or cold regions, and promote the development and sales of related industries.

What is claimed is:
1. A thermoresponsive facial mask comprising:
a non-woven fabric structure, sequentially comprising:
a first layer comprising multiple first superfine fibers;
a second layer comprising multiple second superfine fibers;
a third layer comprising multiple far-infrared hollow fibers; and
a fourth layer comprising multiple functional fibers, wherein:
a volume of the first layer and the second layer combined takes 20 to 30% of the entire volume of the non-woven fabric structure;
the far-infrared hollow fibers are polyester hollow fibers contents a far-infrared material emitting a far-infrared radiation; and the functional fibers are made of polyacrylate and exhibits a moisture absorbing and thermal generating function; and a formula contented in the non-woven fabric structure comprising a polyalcohol and a germanium element, wherein:

the polyalcohol takes a percent volume of the formula between 8 to 20%; and the germanium element takes a concentration of the formula between to 20 ppm.

2. The thermoresponsive facial mask as claimed in claim 1, wherein the far-infrared hollow fibers comprise far-infrared powders, and the far-infrared powders have a volume between 5% and 10% of a volume of the far-infrared hollow fibers.

3. The thermoresponsive facial mask as claimed in claim 2, wherein:

each one of the first superfine fibers and the second superfine fibers have a fiber diameter between 0.8 and 2.0 denier and a fiber length between 30 and 60 micrometer;

the first superfine fibers are made of cellulose fiber, rayon fiber, polyester fiber or nylon 6 fiber; and the second superfine fibers are made of cellulose fiber, rayon fiber, polyester fiber or nylon fiber.

4. The thermoresponsive facial mask as claimed in claim 3, wherein the polyalcohol is selected from the group consisting of propylene glycol, butylene glycol, glycerol, pentanediol, ethohexadiol and ethylene glycol, and the polyalcohol takes the percent volume of the formula is 15% and the germanium element takes the concentration of the formula is 15 ppm.

5. The thermoresponsive facial mask as claimed in claim 4, wherein the functional fibers have a fiber diameter between 0.8 to 1.05 denier and a fiber length between and 60 micrometer.

6. The thermoresponsive facial mask as claimed in claim 5, wherein the third layer has a volume between 30 and 40% of the volume of the non-woven fabric structure; and a fourth layer comprising the functional fibers, the fourth layer has a volume between 20 and 30% of the volume of the non-woven fabric structure.

7. The thermoresponsive facial mask as claimed in claim 6, wherein the first layer and the second layer are combined to form a single superfine fiber layer.

8. The thermoresponsive facial mask as claimed in claim 6, wherein the first superfine fibers and the second superfine fibers have different fiber diameters.

9. The thermoresponsive facial mask as claimed in claim 7, wherein the first superfine fibers and the second superfine fibers have different fiber diameter.

* * * * *